United States Patent [19]
Sellstedt et al.

[11] 3,886,150
[45] May 27, 1975

[54] 4-OXO-5-THIAZOLINYL(THIAZINYL)ACETAMIDO-CEPHALOSPORANIC

[75] Inventors: John H. Sellstedt, King of Prussia; Daniel M. Teller, Devon; Charles J. Guinosso, King of Prussia, all of Pa.

[73] Assignee: American Home Products Corporation, New York, N.Y.

[22] Filed: Apr. 18, 1973

[21] Appl. No.: 352,158

[52] U.S. Cl............ 260/243 C; 424/246; 260/239.1; 424/271
[51] Int. Cl...................... C07d 99/24; C07d 99/16
[58] Field of Search................................ 260/243 C

[56] References Cited
UNITED STATES PATENTS
3,781,277  12/1973  Carroll............................ 260/239.1

Primary Examiner—Nicholas S. Rizzo
Attorney, Agent, or Firm—Richard K. Jackson

[57]  ABSTRACT

Various derivatives of 4-oxo-5-thiazolinyl(thiazinyl)acetamidocephalosporanic and penicillanic acid of potent anti-bacterial activity are produced by acylating 6-aminopenicillanic acid or 7-aminocephalosporanic acid with derivatives of 4-oxo-thiazolin-5-acetic acid and 4-oxo-thiazin-5-acetic acid in the presence of a condensing agent or by conversion to an acid halide.

20 Claims, No Drawings

4-OXO-5-THIAZOLINYL(THIAZINYL)ACETAMIDO-CEPHALOSPORANIC

DESCRIPTION OF THE INVENTION

In accordance with this invention there is provided chemical compounds of the formula:

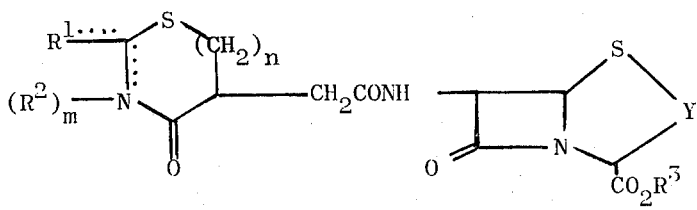

wherein
$R^1$ is a member selected from the group consisting of oxo, (lower)alkylimino, aralkylimino of 7 to 10 carbon atoms, arylimino of 6 to 10 carbon atoms, (lower)-alkylidene hydrazino, and di(lower)alkylamino radicals;
$R^2$ is a member selected from the group consisting of hydrogen and (lower)alkyl radicals when $m$ is 1;
$R^3$ is a member selected from the group consisting of hydrogen, and lower alkyl radicals, and an alkali metal cation;
$n$ is one of the integers 0 and 1;
$m$ is one of the integers 0 and 1;
Y is a member selected from the group consisting of

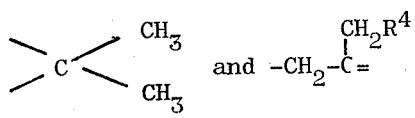

in which $R^4$ is —H, lower alkanoyloxy,

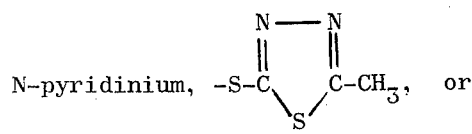

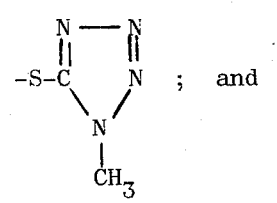

the dotted lines represent appropriate valence bonds based upon the substituent $R^1$.

In the preceding paragraph and throughout the specification and claims, the term "lower" is used to modify alkyl, alkylidene and alkanoyloxy to designate the presence of from 1 to 6 carbon atoms in the modified term.

Thus, the anti-bacterial compounds of this invention are 2-oxo- and 2-imino-4-oxo-5-thiazolidinylacetamido-, 2-oxo and 2-imino-4-oxo-tetrahydro-2H-1,3-thiazin-5-ylacetamido-, 2-amino-4-oxo-5-thiazolinylacetamido-, and 2-amino-4-oxo-5,6-dihydro-4H-1,3-thiazin-5-ylacetamido-cephalosporanic and penicillanic acids, and the lower alkyl esters and alkali metal salts thereof. Each of these compounds are prepared by reacting the precursor acetic acid derivative with an appropriate 6-amino-penicillanic or cephalosporanic acid derivative in the presence of a condensing agent such as carbonyl diimidazole, dicyclohexylcarbodiimide, dicyclohexylcarbodiimide in the presence of N-hydroxysuccinimide or 1-hydroxybenzotriazole, isobutylchloroformate, and the like. These and similar condensing agents which are operable in the preparation of the anti-bacterial agents of this invention are presented in Spencer et al., J. Med. Chem. 9, pp. 746–750 (1966); Micetich et al., J. Med. Chem. 15, pp. 333–335 (1972); Klausner et al., Synthesis, pp. 453–463 (1972) and U.S. Pat. No. 3,338,896.

Alternatively, the precursor acetic acid derivative may be converted by known means to an acid halide which is then used in aqueous medium to acylate the free amino group of either a tertiary amine salt or an alkali metal salt of the 7-amino-cephalosporanic or 6-amino-penicillanic acid. In addition, the acetic acid halide precursor may be used to react in organic solution with either a tertiary amine salt or a silylated, phosphorylated or saccharinated derivative of the 7-amino-cephalosporanic acid or the 6-amino-penicillanic acid derivative.

The precursor acetic acid derivatives are prepared by the methods disclosed by Trivedi et al., J. Indian Chem. Soc., 43, pp 265–268 (1966); Arakelian et al., J. Org. Chem., 25, pp 465–467 (1960); and Japanese Patent No. 11255/66 (Derwent No. 22,031) in accordance with the reactions

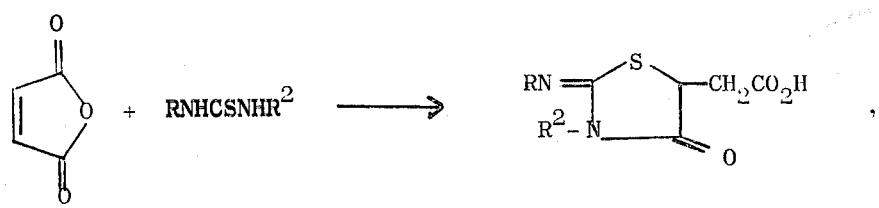

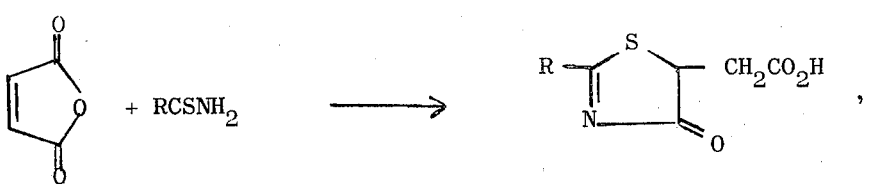

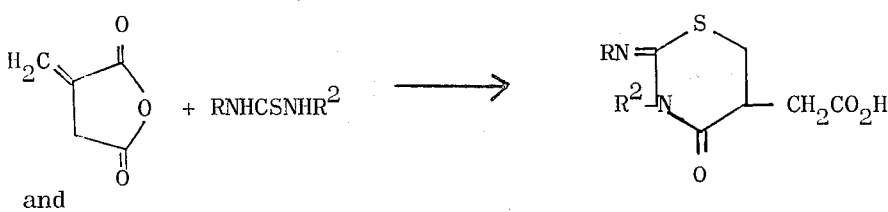

and

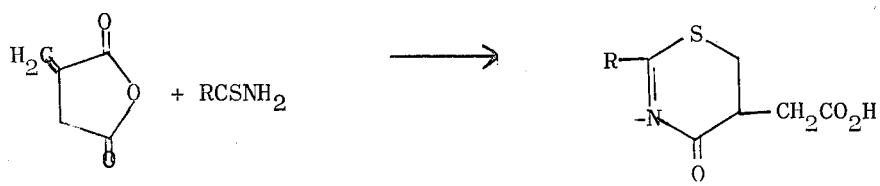

The anti-bacterial agents of this invention, based upon the preceding acetic acid derivatives are depicted by the four following structural formulae:

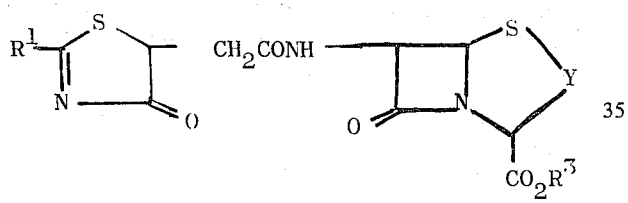

in which $R^1$ is oxo, (lower)alkylimino, aralkylimino of 7 to 10 carbon atoms, or arylimino of 6 to 10 carbon atoms; $R^2$ is hydrogen or (lower)alkyl and $R^3$ and Y are defined above;

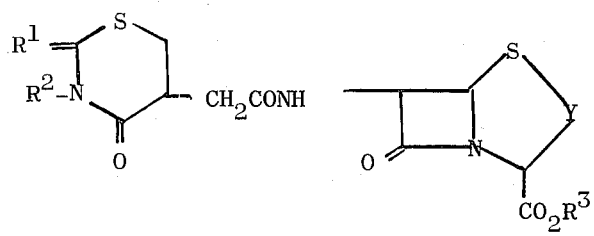

in which $R^1$ is (lower)alkylidenehydrazino or di-(lower)-alkylamino and $R^3$ and Y are defined above;

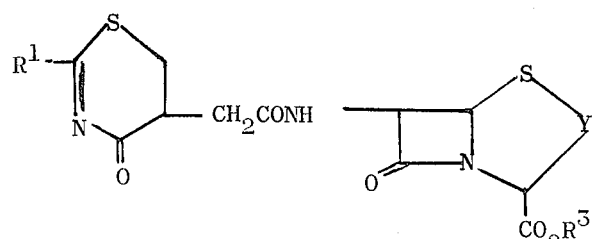

in which $R^1$ is oxo, (lower)alkylimino, aralkylimino of 7 to 10 carbon atoms, or arylimino of 6 to 10 carbon atoms; $R^2$ is hydrogen or (lower)alkyl and $R^3$ and Y are defined above; and

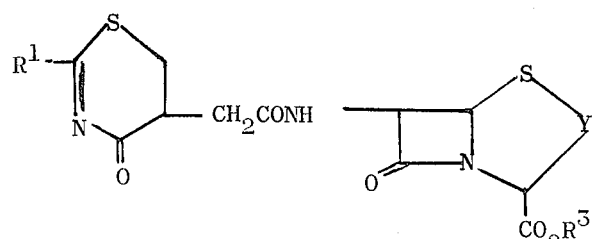

in which $R^1$ is (lower)alkylidenehydrazino or di-(lower)-alkylimino and $R^3$ and Y are defined above.

The compounds of this invention are active antibacterials effective against gram-positive and gram-negative test organisms as well as penicillin resistant staphlococcus at an inhibitory concentration at or below 250 micrograms per milliliter using the well known and scientifically accepted agar serial dilution testing technique. Thus, the compounds of this invention are useful in the fields of comparative pharmacology and in microbiology and may be used as growth promotors in animals and for the treatment of infections amenable to treatment with penicillins and cephalosporins. The specific activity of the compounds exemplified in the following examples is provided, infra, for those specific bacterial strains against which the compound exemplified was active at a minimum inhibitory concentration at or below 31.3 micrograms per milliliter. It is to be understood that activity against bacteria other than those specifically listed occurs at concentrations above 31.3 micrograms per milliliter. The bacteria are named followed by the specific strain and the concentration in micrograms per milliliter at which 100 per cent inhibition occurred. The abbreviations for each bacteria are ST AU — *Staphylococcus aureus*
BA SU — *Bacillus subtilis*
NE CA — *Neisseria catarrhalis*
SA PA — *Salmonella paratyphi*
KL PN — *Klebsiella pneumoniae*
HE SP — *Herellea species*
ES CO — *Escherichia coli*
BO BR — *Bordetella brochiseptica* the following examples are given by way of illustration and are not to be construed as limitations upon the true scope of the invention. In the working examples the expression ACA means aminocephalosporanic acid, the expression APA means aminopenicillanic acid, and the expression ADCA means amino-desacetoxycephalosporanic acid.

EXAMPLE 1

7-[2-(2-Dimethylamino-4-oxo-2-thiazolin-5-yl)acetamido]cephalosporanic acid

To a solution of 2-dimethylamino-4-oxo-2-thiazoline-5-acetic acid (2.02 g, 0.010 moles) in dry dimethylformamide (20 ml) at room temperature is added carbonyldiimidazole (1.62 g, 0.010 moles) under nitrogen. Carbon dioxide evolution begins immediately. After 30 minutes at room temperature the residual carbon dioxide is removed under vacuum, the mixture cooled to −10°C. and a solution of 7-amino cephalosporanic acid (2.72 g, 0.010 moles) in dry methylene chloride (40 ml) containing triethylamine (4.17 ml) is added all at once. After stirring 2 hours at room temperature the mixture is concentrated in vacuo below 40°C. n-Butanol (20 ml) and dimethylformamide (20 ml) are added. The solution is treated with charcoal, filtered and potassium ethyl hexanoate (5.0 ml of a 2M solution in n-butanol) is added. After stirring 10 minutes, diethyl ether is added (500 ml) and the product filtered and dried in vacuo to yield the title compound, mp. 149°C. (decomp.); $\lambda_{max}^{KBr}$ 3.00, 5.70, 6.00, 6.35 μ; NMR has 2.11, 3.20 and 3.28 ppm peaks.

| BA SU | 6633  | .976 |
|-------|-------|------|
| ST AU | 6538P | 1.95 |
| ST AU | SMITH | 1.95 |
| ST AU | CHP   | 3.9  |
| ST AU | 53–180| 7.81 |
| KL PN | 10031 | 31.3 |
| SA PA | 11737 | 31.3 |

EXAMPLE 2

6-[2-(2-Dimethylamino-4-oxo-2-thiazolin-5-yl)acetamido]penicillanic acid

Using the procedure described in Example 1 but substituting 6-APA (2.16 g, 0.010 moles) for 7-ACA and purifying the product by dissolving in methanol and precipitating with ether gives the title compound, mp. 200°C. (decomp.); $\lambda_{max}^{KBr}$ 3.00, 5.64, 6.00, 6.34 μ; NMR has 1.45, 1.55, 3.08 and 3.19 ppm peaks.

| ST AU | 6538P | .976 |
|-------|-------|------|
| ST AU | SMITH | .976 |
| BA SU | 6633  | 1.95 |
| NE CA | 8193  | 31.3 |
| SA PA | 11737 | 31.3 |

EXAMPLE 3

7-[2-(3-Methyl-2-methylimino-4-oxo-5-thiazolidinyl)acetamido]-cephalosporanic acid Using procedure described in Example 1 but substituting 3-methyl-2-methylimido-4-oxo-5-thiazolidine acetic acid (2.02 g, 0.001 moles) for 2-dimethylamino-4-oxo-2-thiazoline-5-acetic acid and 14 ml of dimethylformamide insted of 20 ml gives the title compound, mp. 165°C. (decomp.); $\lambda_{max}^{KBr}$ 3.00, 5.74, 6.10, 6.28 μ; NMR has 2.14, 3.12 and 3.14 ppm peaks.

| BA SU | 6633  | .122 |
|-------|-------|------|
| ST AU | 6538P | .976 |
| ST AU | SMITH | .976 |
| ST AU | CHP   | 1.95 |
| ST AU | 53–180| 1.95 |
| KL PN | 10031 | 31.3 |
| SA PA | 11737 | 31.3 |

EXAMPLE 4

6-[2-(3-Methyl-2-methylimino-4-oxo-5-thiazolidinyl)acetamido]-penicillanic acid Using the procedure described in Example 1 but substituting 3-methyl-2-methylimino-4-oxo-5-thiazolidine acetic acid (2.02 g, 0.0001 moles) for 2-dimethylamino-4-oxo-2-thiazoline-5-acetic acid and 6-APA (2.16 g, 0.010 moles) for 7-ACA upon purification by dissolving in methanol and precipitating with diethyl ether gives the title compound, mp. 210°C. (decomp.); $\lambda_{max}^{KBr}$ 3.00, 5.66, 6.10, 6.25 μ; NMR has 1.52, 1.65, 3.11 and 3.11 and 3.44 ppm peaks.

| BA SU | 6633  | 1.95 |
|-------|-------|------|
| ST AU | 6538P | 1.95 |
| ST AU | SMITH | 1.95 |
| NE CA | 8193  | 7.81 |
| HE SP | 9955  | 31.3 |
| SA PA | 11737 | 31.3 |
| ST AU | CHP   | 31.3 |

EXAMPLE 5

7-[2-(2-Methylimino-4-oxothiazolidin-5-yl)acetamido]cephalosporanic acid

Using the procedure described in Example 1 but substituting 2-methylimino-4-oxothiazolidin-5-acetic acid (1.88 g, 0.01 moles) for 2-dimethylamino-4-oxo-2-thiazoline-5-acetic acid gives the title compound, mp. 220°–240°C. (decomp.); $\lambda_{max}^{KBr}$ 5.70, 6.23 μ; NMR has 2.14 ppm peak.

| BA SU | 6633  | .488 |
|-------|-------|------|
| ST AU | 6538P | 1.95 |
| ST AU | SMITH | 1.95 |
| ST AU | CHP   | 1.95 |
| ST AU | 53–180| 1.95 |
| KL PN | 10031 | 31.3 |
| SA PA | 11737 | 31.3 |

EXAMPLE 6

6-[2-(2-Methylimino-4-oxo-5-thiazolidinyl)acetamido]penicillanic acid

Using the procedure described in Example 1 but substituting 2-methylimino-4-oxathiaxolidin-5-acetic acid (1.88 g, 0.01 moles) for 2-dimethylamino-4-oxo-2-thiazoline-5-acetic acid and 6-APA (2.16 g, 0.01 moles) for 7-ACA gives the title compound, mp. 128°–132°C. (decomp.); $\lambda_{max}^{KBr}$ 5.70, 6.00 μ; NMR has 1.57 and 1.68 ppm peaks.

| ST AU | 6538P | .976 |
|-------|-------|------|
| ST AU | SMITH | .976 |
| BA SU | 6633  | 1.95 |
| NE CA | 8193  | 15.6 |
| SA PA | 11737 | 15.6 |
| ST AU | CHP   | 31.3 |

EXAMPLE 7

7-[2-(2-Dimethylamino-4-oxo-2-thiazolin-5-yl)acetamido]-3-methyl-8-oxo-5-thia-1-azabicyclo[4.2.0]oct-2-ene-2-carboxylic acid To a solution of 2-dimethylamino-4-oxo-2-thiazoline-5-acetic acid (2.02 g, 0.01 moles) in dry dimethylformamide (20 ml) containing triethylamine (1.39 ml) at −10°C. under nitrogen is added all at once isobutyl chloroformate (1.30 ml, 0.02 moles). The mixture is stirred at −10°C. for 10 minutes and a solution of 7-ADCA (2.14 g, 0.005 moles) and triethylamine (1.39 ml) in water/dimethyl formamide (1:1, 20 ml) is added all at once. The mixture is stirred at 5°C. for 1 hour and 25°C. for 1 hour. After evaporation in vacuo below 40°C. a solution of 120 ml of water and 40 ml of ethyl acetate is added. The mixture is shaken thoroughly and the organic layer is discarded. The aqueous layer is cooled to 5°C. 120 ml of ethyl acetate is added and the mixture acidified to pH = 3.0 with 10 percent aqueous hydrochloric acid. The organic layer is separated and the aqueous layer is extracted with 40 ml of ethyl acetate. The combined extract and organic layer is washed with water, brine and dried over anhydrous sodium sulfate. Evaporation in vacuo below 40°C. leaves a solid, mp. 239°C. (decomp.); $\lambda_{max}^{KBr}$ 5.62, 5.81, 6.00 μ; NMR has 2.06, 3.12 and 3.23 ppm peaks.

| BA SU | 6633 | 15.6 |
|-------|------|------|

EXAMPLE 8

3-Methyl-7-[2-(3-methyl-2-methylimino-4-oxo-5-thiazolidinyl)-acetamido]-8-oxo-5-thia-azabicyclo[4.2.0]oct-2-ene-2-carboxylic acid Using the procedure described in Example 7, but substituting 3-methyl-2-methylimino-4-oxothiazolidine-5-acetic acid (2.02 g, 0.01 moles) for 2-dimethylamino-4-oxo-2-thiazoline-5-acetic acid gives the title compound, mp. 252°C. (decomp.); $\lambda_{max}^{KBr}$ 5.65, 5.80 and 6.00–6.18 $\mu$; NMR has 2.18, 3.31 and 3.48 ppm peaks.

| BA SU | 6633 | 3.90 |
| ST AU | 6538P | 3.90 |
| ST AU | SMITH | 3.90 |
| ST AU | CHP | 15.6 |
| ST AU | 53–180 | 15.6 |

EXAMPLE 9

6-[2-(2-Isopropylidenehydrazino-4-oxo-2-thiazolin-5-yl)acetamido]-penicillanic acid Using the procedure described in Example 7, but substituting 2-isopropylidenehydrazino-4-oxo-2-thiazolin-5-acetic acid (1.45 g, 0.005 moles) for 2-dimethylamino-4-oxo-2-thiazoline-5-acetic acid and 6-APA (1.08 g, 0.005 moles) for 7-ADCA and converting to the potassium salt with potassium ethyl hexanoate gives the title compound, mp. 200°–210°C. (decomp.); $\lambda_{max}^{KBr}$ 5.70, 5.99, 6.12, 6.25 $\mu$; NMR has 1.51, 1.66, 2.00 and 2.07 ppm peaks.

| ST AU | 6538P | 3.90 |
| ST AU | SMITH | 3.90 |
| BA SU | 6633 | 7.81 |

EXAMPLE 10

7-[2-(3-Benzyl-2-benzylimino-4-oxo-5-thiazolidinyl)acetamido]-cephalosporanic acid Using the procedure described in Example 1 but substituting 3-benzyl-2-benzylimino-4-oxo-5-thiazolidinyl acetic acid (3.54 g, 0.010 moles) for 2-dimethylamino-4-oxo-2-thiazoline-5-acetic acid and purifying by dissolving in methanol and precipitating with diethyl ether gives the title compound, mp. 155°C. (decomp.); $\lambda_{max}^{KBr}$ 3.00, 5.74, 6.14, 6.28 $\mu$; NMR has 2.10 and 2.24 ppm peaks.

| BA SU | 6633 | .488 |
| ST AU | 6538P | .488 |
| ST AU | SMITH | .488 |
| ST AU | CHP | 1.95 |
| NE CA | 8193 | 3.90 |
| KL PN | 10031 | 31.3 |

EXAMPLE 11

6-[2-(3-Benzyl-2-benzylimino-4-oxo-5-thiazolidinyl)acetamido]-penicillanic acid

Using the procedure described in Example 1 but substituting 3-benzyl-2-benzylimino-4-oxo-5-thiazolidinyl acetic acid (3.54 g, 0.010 moles) for 2-dimethylamino-4-oxo-2-thiazolin-5-acetic acid and 6-APA (2.16 g, 0.010 moles) for 7-ACA and purifying by dissolving in methanol and precipitating with diethyl ether gives the title compound, mp. 200°C. (decomp.); $\lambda_{max}^{KBr}$ 3.00, 5.70, 6.10 and 6.28 $\mu$; NMR has 1.60 and 1.70 ppm peaks.

| ST AU | 6538P | .488 |
| ST AU | SMITH | .976 |
| BA SU | 6633 | 7.81 |
| NE CA | 8193 | 7.81 |
| ST AU | CHP | 15.6 |
| HE SP | 9955 | 31.3 |

EXAMPLE 12

7-[2-2,4-Dioxo-5-thiazolidinyl)acetamido]cephalosporanic acid

Using the procedure described in Example 1 but substituting 2,4-dioxothiazolidinyl-5-acetic acid (1.75 g, 0.01 moles) for 2-dimethylamino-4-oxo-2-thiazoline-5-acetic acid gives the title compound, mp. 143°–147°C. (decomp.); $\lambda_{max}^{KBr}$ 5.70, 6.20 $\mu$; NMR has 2.10 ppm peak.

| BA SU | 6633 | .976 |
| ST AU | 6538P | 1.95 |
| ST AU | SMITH | 1.95 |
| ST AU | CHP | 7.81 |
| SA PA | 11737 | 31.3 |
| ST AU | 53–180 | 31.3 |

EXAMPLE 13

7-[2-(2,4-Dioxo-5-thiazolidinyl)acetamido]-3-methyl-5-thia-1-azabicyclo[4.2.0]oct-2-ene-carboxylic acid Using the procedure described in Example 1 but substituting 2,4-dioxothiazolidinyl-5-acetic acid (1.75 g, 0.01 moles) for 2-dimethylamino-4-oxo-2-thiazoline-5-acetic acid, 7-ADCA (2.12 g, 0.01 moles) for 7-ACA and 1,5-diazabicyclo[4.3.0]non-5-ene (1.24 g, 0.01 moles) for triethyl amine gives the title compound, mp. 120°–143°C. (decomp.); $\lambda_{max}^{KBr}$ 5.70, $\mu$; NMR has 1.89 ppm peak.

| BA SU | 6633 | 15.6 |
| ST AU | SMITH | 15.6 |
| ST AU | 6538P | 31.3 |

EXAMPLE 14

6-[2-(2,4-Dioxo-5-thiazolidinyl)acetamido]penicillanic acid

Using the procedure described in Example 1 but substituting 2,4-dioxothiazolidinyl-5-acetic acid (1.75 g, 0.01 moles) for 3-dimethylamino-4-oxo-2-thiazoline-5-acetic acid and 6-APA (2.16 g, 0.01 moles) for 7-ACA gives the title compound, mp. 165°C. (decomp.); $\lambda_{max}^{KBr}$ 5.68, 5.95, 6.30 $\mu$; NMR has 1.53 and 1.65 ppm peaks.

| | | |
|---|---|---|
| ST AU | 6538P | .976 |
| ST AU | SMITH | .976 |
| BA SU | 6633 | 3.90 |
| SA PA | 11737 | 3.90 |
| NE CA | 8193 | 15.6 |
| ST AU | CHP | 31.3 |

EXAMPLE 15

7-[2-(2-Dimethylamino-5,6-dihydro-4-oxo-4$\underline{H}$-1,3-thiazin-5-yl)-acetamido]cephalosporanic acid Using the procedure described in Example 1 but substituting 2-dimethylamino-5,6-dihydro-4-oxo-4$\underline{H}$-1,3-thiazin-5-acetic acid (2.16 g, 0.010 moles) for 2-dimethylamino-4-oxo-2-thiazolin-5-acetic acid and purifying by dissolving in methanol and precipitating with diethyl ether gives the title compound, mp. 150°C. (decomp.); $\lambda_{max}^{KBr}$ 5.70, 6.24 $\mu$; NMR has 2.08 and 3.21 ppm peaks.

| | | |
|---|---|---|
| BA SU | 6633 | 1.95 |
| ST AU | 6538P | 7.81 |
| ST AU | SMITH | 7.81 |
| ST AU | CHP | 15.6 |
| KL PN | 10031 | 31.3 |
| ST AU | 53–180 | 31.3 |

EXAMPLE 16

7-[2-(2-Dimethylamino-5,6-dihydro-4-oxo-4$\underline{H}$-1,3-thiazin-5-yl)-acetamido]-4-methyl-8-oxo-5-thia-1-azabicyclo[4.2.0]oct-2-ene-2-carboxylic acid Using the procedure described in Example 1 but substituting 2-dimethylamino-5,6-dihydro-4-oxo-4$\underline{H}$-1,3thiazin-5-acetic acid (2.16 g, 0.01 moles) for 2-dimethylamino-4-oxo-2-thiazolin-5-acetic acid, 7-ADCA (2.14 g, 0.01 moles) for 7-ACA and 1.5-diazabicyclo[4.3.0]non-5-ene (1.24 g, 0.01 moles) for triethyl amine gives the title compound, mp. 153°–180°C. (decomp.); $\lambda_{max}^{KBr}$ 5.71, 6.25 $\mu$; NMR has 1.94 ppm peak.

| | | |
|---|---|---|
| BA SU | 6633 | 31.3 |

EXAMPLE 17

6-[2-(2-Dimethylamino-5,6-dihydroxy-4-oxo-4$\underline{H}$-1,3-thiazin-5-yl)acetamido]penicillanic acid Using the procedure described in Example 1 but substituting 2-dimethylamino-5,6-dihydro-4-oxo-4$\underline{H}$-1,3-thiazin-5-acetic acid (2.16 g, 0.010 moles) for 2-dimethylamino-4-oxo-2-thiazolin-5-acetic acid and 6-APA (2.16 g, 0.010 moles) for 7-ACA and dissolving in methanol and precipitating with methanol gives the title compound, mp. 195°C. (decomp.); $\lambda_{max}^{KBr}$ 5.70, 6.28 $\mu$; NMR has 1.50 and 1.60 ppm peaks.

| | | |
|---|---|---|
| ST AU | 6538P | 1.95 |
| ST AU | SMITH | 1.95 |
| BA SU | 6633 | 7.81 |

-Continued

| | | |
|---|---|---|
| HE SP | 9955 | 31.3 |
| SA PA | 11737 | 31.3 |

EXAMPLE 18

7-[2-(tetrahydro-3-methyl-2-methylimino-4-oxo-2$\underline{H}$-1,3-thiazin-5-yl)acetamido]cephalosporanic acid Using the procedure described in Example 1 but substituting 2-tetrahydro-4-methyl-2-methalimino-4-oxo-2$\underline{H}$-1,3-thiazin-5-acetic acid (2.18 g, 0.01 moles) for 2-dimethylamino-4-oxo-2-thiazoline-5-acetic acid gives the title compound, mp. 170°–200°C. (decomp.); $\lambda_{max}^{KBr}$ 5.72, 6.25 $\mu$; NMR has 2.10 ppm peak.

| | | |
|---|---|---|
| BA SU | 6633 | .488 |
| ST AU | 6538P | 1.95 |
| ST AU | SMITH | 1.95 |
| ST AU | CHP | 7.81 |
| ST AU | 53–180 | 7.81 |
| KL PN | 10031 | 15.6 |
| SA PA | 11737 | 15.6 |
| ES CO | 9637 | 31.3 |

EXAMPLE 19

3-Methyl-8-oxo-7-[2-(tetrahydro-3-methyl-2-methylimino-4-oxo-2$\underline{H}$-1,3-thiazin-5-yl)acetamido]-5-thia-azabicyclo[4.2.0]oct-2-ene-2-carboxylic acid Using the procedure described in Example 1 but substituting 2-(tetrahydro-3-methyl-2-methylimino-4-oxo-2$\underline{H}$-1,3-thiazin-5-acetic acid (2.18 g, 0.01 moles) for 2-dimethylamino-4-oxo-2-thiazoline-5-acetic acid, 7-ADCA (2.12 g, 0.01 moles) for 7-ACA and 1,5-diazabicyclo[4.3.0]non-5-ene (1.24 g, 0.01 moles) for triethyl amine gives the title compound, mp. 195°–230°C. (decomp.); $\lambda_{max}^{KBr}$ 5.75, 6.33 $\mu$; NMR has 1.94 ppm peak.

| | | |
|---|---|---|
| BA SU | 6633 | 31.3 |

EXAMPLE 20

6-[2-(Tetrahydro-3-methyl-2-methylimino-4-oxo-2$\underline{H}$-1,3-thiazin-5-yl)acetamido]penicillanic acid Using the procedure described in Example 1 but substituting 2-(tetrahydro-3-methyl-2-methylimino-4-oxo-2$\underline{H}$-1,4-thiazin-5-acetic acid (2.18 g, 0.01 moles) for 2-dimethylamino-4-oxo-2-thiazoline-5-acetic acid and 6-APA (2.16 g, 0.01 moles) for 7-ACA gives the title compound, mp. 170°–175°C. (decomp.); $\lambda_{max}^{KBr}$ 5.69, 6.05 $\mu$; NMR has 1.51 and 1.63 ppm peaks.

| | | |
|---|---|---|
| ST AU | 6538P | 15.6 |
| ST AU | SMITH | 15.6 |
| BA SU | 6633 | 31.3 |

EXAMPLE 21

7-[2-(5,6-Dihydro-2-isopropylidenehydrazino-4-oxo-4H-1,3-thiazin-5-yl)acetamido]cephalosporanic acid Using the procedure described in Example 1 but substituting 5,6-dihydro-2-isopropylidenehydrazino-4-oxo-4H-1,3-thiazine-5-acetic acid (2.44 g, 0.01 moles) for 2-dimethylamino-4-oxo-2-thiazoline-5-acetic acid gives the title compound, mp. 240°–260°C. (decomp.); $\lambda_{max}^{KBr}$ 5.75, 6.27 $\mu$; NMR has 2.01 ppm peak.

| BA SU | 6633   | 1.95 |
|-------|--------|------|
| ST AU | 6538P  | 7.81 |
| ST AU | SMITH  | 7.81 |
| ST AU | CHP    | 31.3 |
| ST AU | 53–180 | 31.3 |

EXAMPLE 22

7-[2-(5,6-Dihydro-2-isopropylidenehydrazino-4-oxo-4H-1,3-thiazin-5-yl)acetamido]-3-methyl-8-oxo-5-thia-1-azabicyclo[4.2.0]-oct-2-ene-2-carboxylic acid Using the procedure described in Example 1 but substituting 5,6-dihydro-2-isopropylidenehydrazino-4-oxo-4H-1,3-thiazine-5-acetic acid (2.44 g, 0.01 moles) for 2-dimethylamino-4-oxo-2-thiazoline-5-acetic acid, 7-ADCA (2.12 g, 0.01 moles) for 7-ACA and 1,5-diazabicyclo[4.3.0]non-5-ene (1.24 g, 0.01 moles) for triethyl amine gives the title compound, mp. 160°–173°C. (decomp.); $\lambda_{max}^{KBr}$ 5.70, 6.27 $\mu$; NMR has 1.92, 1.95 and 2.08 ppm peaks.

| BA SU | 6633 | 31.3 |
|-------|------|------|

EXAMPLE 23

6-[2-(5,6-Dihydro-2-isopropyldenehydrazino-4-oxo-4H-1,3-thiazin-5-yl)acetamido]penicillanic acid Using the procedure described in Example 1 but substituting 5,6-dihydro-2-isopropylidenehydrazino-4-oxo-4H-1,3-thiazine-5-acetic acid (2.44 g, 0.01 moles) for 2-dimethylamino-4-oxo-2-thiazoline-5-acetic acid and 6-APA (2.16 g, 0.01 moles) for 7-ACA gives the title compound, mp. 210°–218°C. (decomp.); $\lambda_{max}^{KBr}$ 5.68, 5.98, 6.22 $\mu$; NMR has 1.51 ppm peak.

| ST AU | 6538P | 3.90 |
|-------|-------|------|
| ST AU | SMITH | 3.90 |
| BA SU | 6633  | 7.81 |
| HE SP | 9955  | 7.81 |
| BO BR | 4617  | 31.3 |
| ES CO | 9637  | 31.3 |
| SA PA | 11737 | 31.3 |

EXAMPLE 24

7-[2-(Tetrahydro-2-methylimino-4-oxo-2H-1,3-thiazin-5-yl)acetamido]-cephalosporanic acid Using the procedure described in Example 1 but substituting tertrahydro-2-methylimino-4-oxo-2H-1,3-thiazin-5-acetic acid (2.02 g, 0.01 moles) for 2-dimethylamino-4-oxo-2-thiazoline-5-acetic acid gives the title compound, mp. 160°–170°C. (decomp.); $\lambda_{max}^{KBr}$ 5.70, 6.20 $\mu$; NMR has 2.12 ppm peak.

| BA SU | 6633   | .976 |
|-------|--------|------|
| ST AU | 6538P  | 1.95 |
| ST AU | SMITH  | 1.95 |
| ST AU | CHP    | 7.81 |
| ST AU | 53–180 | 7.81 |
| KL PN | 10031  | 15.6 |
| ES CO | 9637   | 31.3 |
| SA PA | 11737  | 31.3 |

EXAMPLE 25

6-[2-(Tetrahydro-2-methylimino-4-oxo-2H-1,3-thiazin-5-yl)-acetamido]penicillanic acid Using the procedure described in Example 1 but substituting tetrahydro-2-methylimino-4-oxo-2H-1,3-thiazin-5-acetic acid (2.02 g, 0.01 moles) for 2-dimethylamino-4-oxo-2-thiazoline-5-acetic acid and 6-APA (2.16 g, 0.01 moles) for 7-ACA gives the title compound, mp. 170°–185°C. (decomp.); $\lambda_{max}^{KBr}$ 5.70, 6.05, 6.28 $\mu$; NMR has 1.55 and 1.67 ppm peaks.

| ST AU | 6538P | .976 |
|-------|-------|------|
| ST AU | SMITH | .976 |
| BA SU | 6633  | 7.81 |
| SA PA | 11737 | 31.3 |
| ST AU | CHP   | 31.3 |

What is claimed is:

1. A compound of the formula:

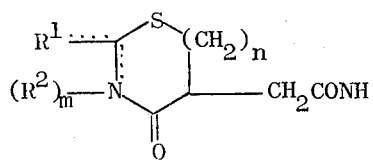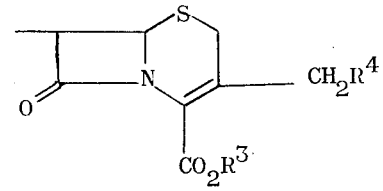

wherein $R^1$ is a member selected from the group consisting of oxo, (lower)alkylimino, benzylimino, (lower)alkylidenehydrazino, and di(lower)alkylamino radicals;

$R^2$ is a member selected from the group consisting of hydrogen, benzyl and (lower)alkyl radicals when $m$ is 1;

$R^3$ is a member selected from the group consisting of hydrogen and (lower)alkyl radicals, and an alkali metal cation;

$n$ is one of the integers 0 and 1;

$m$ is one of the integers 0 and 1;

and the dotted lines represent valence bonds based upon the substituent $R^1$.

2. The compounds of claim 1 which are of the formula

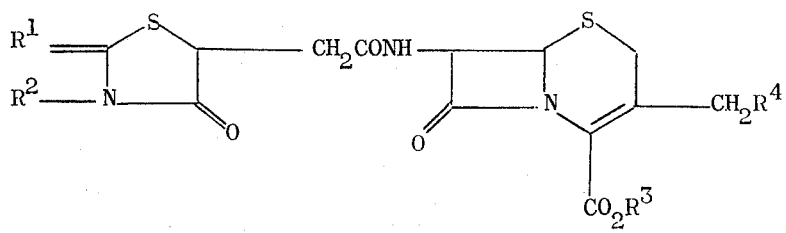

wherein
R¹ is a member selected from the group consisting of oxo, (lower)alkylimino and benzylimino;
R² is a member selected from the group consisting of hydrogen, benzyl and (lower)alkyl;
R³ is a member selected from the group consisting of hydrogen, (lower)alkyl and an alkali metal cation;
R⁴ is a member selected from the group consisting of hydrogen, (lower)alkanoyloxy, N-pyridinium,

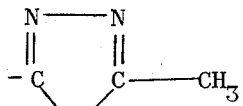 and 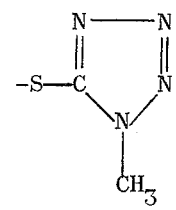

4. The compounds of claim 1 which are of the formula:

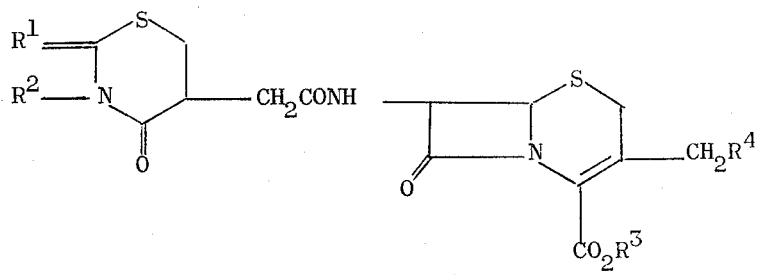

wherein
R¹ is a member selected from the group consisting of oxo and, (lower)alkylimino;
R² is a member selected from the group consisting of hydrogen and (lower)alkyl;
R³ is a member selected from the group consisting of hydrogen, (lower)alkyl and an alkali metal cation;
R⁴ is a member selected from the group consisting of hydrogen, (lower)alkanoyloxy, N-pyridinium,

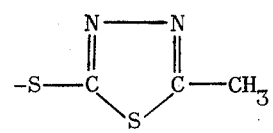 and 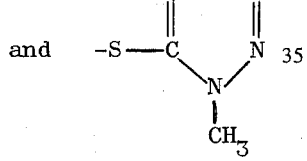

3. The compounds of claim 1 which are of the formula

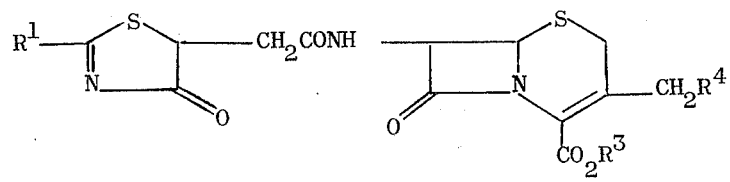

in which
R¹ is a member selected from the group consisting of (lower)alkylidene hydrazino and di(lower)alkylamino radicals;
R³ is a member selected from the group consisting of hydrogen, (lower)alkyl and an alkali metal cation; and
R⁴ is a member selected from the group consisting of —H, (lower)alkanoyloxy, N-pyridinium,

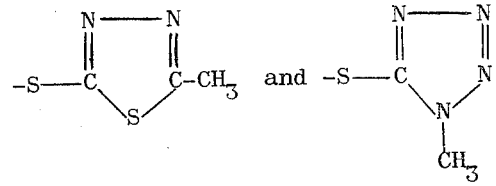

5. The compounds of claim 1 which are of the formula:

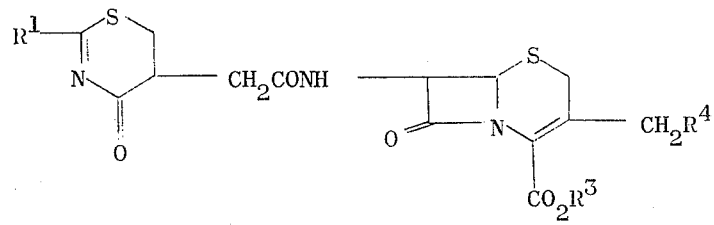

wherein
R¹ is a member selected from the group consisting of (lower)alkylidenehydrazino and di(lower)alkylamino radicals;
R³ is a member selected from the group consisting of hydrogen, and (lower)alkyl radicals, and an alkali metal cation; and
R⁴ is a member selected from the group consisting of hydrogen, (lower)alkanoyloxy, N-pyridinium,

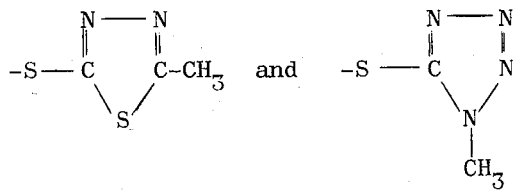

6. The compound of claim 1 which is 7-[2-(2-dimethylamino-4-oxo-2-thiazolin-5-yl)acetamido]cephalosporanic acid and the alkali metal salts thereof.

7. The compound of claim 1 which is 7-[2-(3-methyl-2-methylimino-4-oxo-5-thiazolidinyl)acetamido]cephalosporanic acid and the alkali metal salts thereof.

8. The compound of claim 1 which is 7-[2-(2-methylimino-4-oxothiazolidin-5-yl)acetamido]cephalosporanic acid and the alakli metal salts thereof.

9. The compound of claim 1 which 7-[2-(2-dimethylamino-4-oxo-2-thiazolin-5-yl)acetamido]-3-methyl-8-oxo-5-thia-1-azabicyclo[4.2.0]oct-2-ene-2-carboxylic acid and the alkali metal salts thereof.

10. The compound of claim 1 which is 3-methyl-7-[2-(3-methyl-2-methylimino-4-oxo-5-thiazolidinyl)acetamido]-8-oxo-5-thia-azabicyclo[4.2.0]oct-2-ene-2-carboxylic acid and the alkali metal salts thereof.

11. The compound of claim 1 which is 7-[2-(3-benzyl-2-benzylimino-4-oxo-5-thiazolidinyl)acetamido]-cephalosporanic acid and the alkali metal salts thereof.

12. The compound of claim 1 which is 7-[2-(2,4-dioxo-5-thiazolidinyl)acetamido]cephalosporanic acid and the alkali metal salts thereof.

13. The compound of claim 1 which is 7-[2-(2,4-dioxo-5-thiazolidinyl)acetamido]-3-methyl-5-thia-1-azabicyclo[4.2.0]oct-2-ene-carboxylic acid and the alkali metal salts thereof.

14. The compound of claim 1 which is 7-[2-(2-dimethylamino-5,6-dihydro-4-oxo-4H-1,3-thiazin-5-yl)-acetamido]cephalosporanic acid and the alkali metal salts thereof.

15. The compound of claim 1 which is 7-[2-(2-dimethylamino-5,6-dihydro-4-oxo-4H-1,3-thiazin-5-yl)-acetamido]-3-methyl-8-oxo-5-thia-1-azabicyclo[4.2.0]oct-2-ene-2-carboxylic acid and the alkali metal salts thereof.

16. The compound of claim 1 which is 7-[2-(tetrahydro-3-methyl-2-methylimino-4-oxo-2H-1,3-thiazin-5-yl)acetamido]-cephalosporanic acid and the alkali metal salts thereof.

17. The compound of claim 1 which is 3-methyl-8-oxo-7-[2-(tetrahydro-3-methyl-2-methylimino-4-oxo-2H-1,3thiazin-5-yl)-acetamido]-5-thia-azabicyclo[4.2.0]oct-2-ene-2-carboxylic acid and the alkali metal salts thereof.

18. The compound of claim 1 which is 7-[2-(5,6-dihydro-2-isopropylidenehydrazino-4-oxo-4H-1,3-thiazin-5-yl)acetamido]-cephalosporanic acid and the alkali metal salts thereof.

19. The compound of claim 1 which is 7-[2-(5,6-dihydro-2-isopropylidenehydrazino-4-oxo-4H-1,3-thiazin-5-yl)acetamido]-3-methyl-8-oxo-5-thia-1-azabicyclo[4.2.0]-oct-2-ene-2-carboxylic acid and the alkali metal salts thereof.

20. The compound of claim 1 which is 7-[2-(tetrahydro-2-methylimino-4-oxo-2H-1,3-thiazin-5-yl)acetamido]cephalosporanic acid and the alkali metal salts thereof.

* * * * *

UNITED STATES PATENT OFFICE
CERTIFICATE OF CORRECTION

PATENT NO. : 3,886,150
DATED : May 27, 1975
INVENTOR(S) : John H. Sellstedt, Daniel M. Teller and Charles J. Guinosso It is certified that error appears in the above-identified patent and that said Letters Patent are hereby corrected as shown below:

Column 12, Claim 1, line 64, after the definition of "$R^3$" and before the definition of "n" insert the definition -- $R^4$ is a member selected from the group consisting of hydrogen, (lower)alkanoyloxy, N-pyridinium,

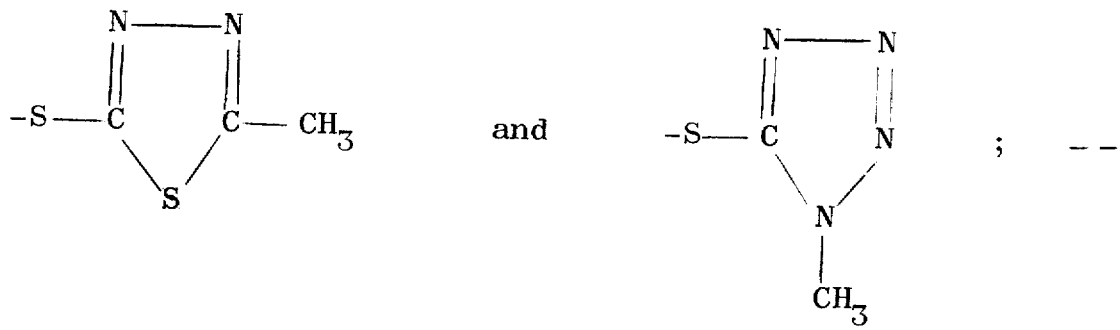

and

Column 14, Claim 3, line 13, the structural formula

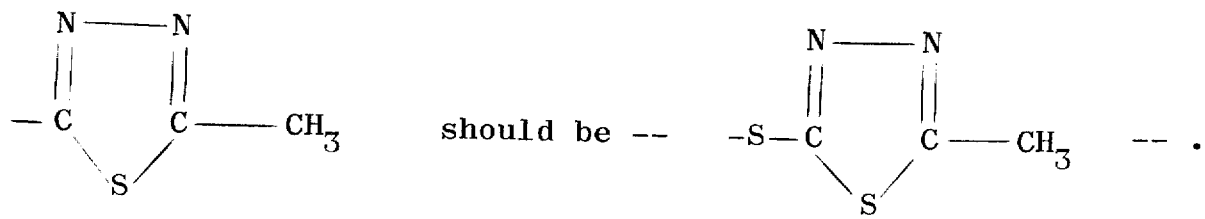

should be -- [structure] -- .

Signed and Sealed this

Tenth Day of August 1976

[SEAL]

Attest:

RUTH C. MASON
Attesting Officer

C. MARSHALL DANN
Commissioner of Patents and Trademarks